(12) United States Patent
Maxwell

(10) Patent No.: US 11,188,725 B2
(45) Date of Patent: Nov. 30, 2021

(54) SYSTEMS AND METHODS FOR CREATING A PHYSICAL MEMENTO WITH DIGITAL TRACKING

(71) Applicant: Roger L. Maxwell, Dallas, TX (US)

(72) Inventor: Roger L. Maxwell, Dallas, TX (US)

( * ) Notice: Subject to any disclaimer, the term of this patent is extended or adjusted under 35 U.S.C. 154(b) by 0 days.

(21) Appl. No.: 17/017,649

(22) Filed: Sep. 10, 2020

(65) Prior Publication Data

US 2021/0073497 A1 Mar. 11, 2021

Related U.S. Application Data

(60) Provisional application No. 62/898,272, filed on Sep. 10, 2019.

(51) Int. Cl.
| | |
|---|---|
| *G06K 7/14* | (2006.01) |
| *G06K 19/06* | (2006.01) |
| *G06F 9/451* | (2018.01) |
| *G06F 16/27* | (2019.01) |

(52) U.S. Cl.
CPC .......... *G06K 7/1417* (2013.01); *G06F 9/453* (2018.02); *G06F 16/27* (2019.01); *G06K 19/06037* (2013.01)

(58) Field of Classification Search
None
See application file for complete search history.

(56) References Cited

U.S. PATENT DOCUMENTS

| 4,665,668 | A | 5/1987 | Serpico | |
|---|---|---|---|---|
| 7,934,298 | B1 | 5/2011 | Ghazvini | |
| 8,364,549 | B2 * | 1/2013 | Sell | A61G 17/00 705/26.1 |
| 8,651,370 | B1 * | 2/2014 | Mudrick | G06Q 30/0239 235/375 |
| 10,192,198 | B2 * | 1/2019 | Nazzari | G06Q 10/087 |
| 2003/0024089 | A1 * | 2/2003 | Dziekonski | A61G 17/08 27/1 |
| 2012/0271732 | A1 * | 10/2012 | Glass | G06Q 30/0641 705/26.5 |
| 2014/0238878 | A1 | 8/2014 | Henwood | |

* cited by examiner

*Primary Examiner* — Kristy A Haupt

(57) ABSTRACT

Systems and methods for creating a physical memento with digital tracking are provided herein. In one example, a system may comprise receiving, at one or more processors, a personal message; transmitting, at the one or more processors via a network interface device coupled to the one or more processors, a secure message based on the personal message to a distributed ledger network, wherein the secure message is recorded in the distributed ledger network and the secure message comprises a timestamp associated with the message; and engraving, via one or more engraving tools, a physical item with information relevant to the message.

18 Claims, 4 Drawing Sheets

SYSTEMS AND METHODS FOR CREATING A PHYSICAL MEMENTO WITH DIGITAL TRACKING

CROSS-REFERENCE TO RELATED APPLICATIONS

This application claims priority to U.S. Provisional Application No. 62/898,272 filed on Sep. 10, 2019, and entitled "SYSTEMS AND METHODS FOR CREATING A PHYSICAL MEMENTO WITH DIGITAL TRACKING," the entire disclosure of which is hereby incorporated by reference for all proper purposes.

FIELD OF DISCLOSURE

This invention relates generally to the memorializing of events and statuses, and more specifically relates to a system for memorializing events using both a physical record of the event and a persistent digital record of the event, which may be accomplished using a blockchain record.

BACKGROUND

Throughout history, people have always had means for memorializing events and statuses in our lives. From ancient means such as artwork on cave walls and the creation of statues and monuments, to more modern means such as desktop items and "love locks" placed in public places, the drive to record events and statuses, and to inform others of them, has been a persistent part of the human experience.

Many of these means, however, are static physical items, requiring personal visitation and the maintenance of access to the mementos. Further, these items may be lost or damaged, such that access to the items may be lost forever, or information contained on the items may be erased or lost.

The creation of an unalterable digital record, in conjunction with the creation of a memorializing artifact, adds important functionality to the memorializing of events and statuses.

SUMMARY

A system enables the creation of creating a physical memento with digital tracking. The system receives, at one or more processors, a message containing information to be memorialized and tracked. The system transmits, at the one or more processors via a network interface device coupled to the one or more processors, a secure message based on the personal message to a distributed ledger network.

The secure message is recorded in the distributed ledger network and the secure message comprises a timestamp associated with the message. Further, a physical item is engraved or otherwise marked, via one or more engraving or marking tools, with information relevant to the message.

DETAILED DESCRIPTION OF THE INVENTION

The present invention employs a combination of digital technology and the creation of a physical object to memorialize life events. Events are memorialized in at least two ways: through the creation of a digital record of the event, and through the creation of a physical item that contains or represents information about the event. Preferably, the physical item contains information allowing a viewer or user to access the digital record.

Memorialization of an event via systems and methods of the present invention preferably generates two persistent records of the event: a physical memento and the creation of a persistent digital record of the event on a blockchain. Information about the event is recorded in a physical item available for display in a special location, and also available for all to search for and confirm via a blockchain record. The invention thus combines the benefits of a physical memento with the benefits of a digital record. Preferably, as will be described, there are links between the physical and digital records so that the physical memento will direct a viewer to the digital record (which may be stored on a plurality of storage devices in a variety of locations), and the digital record contains a depiction of the physical memento (or of insignias displayed on the physical memento).

Figure 1:
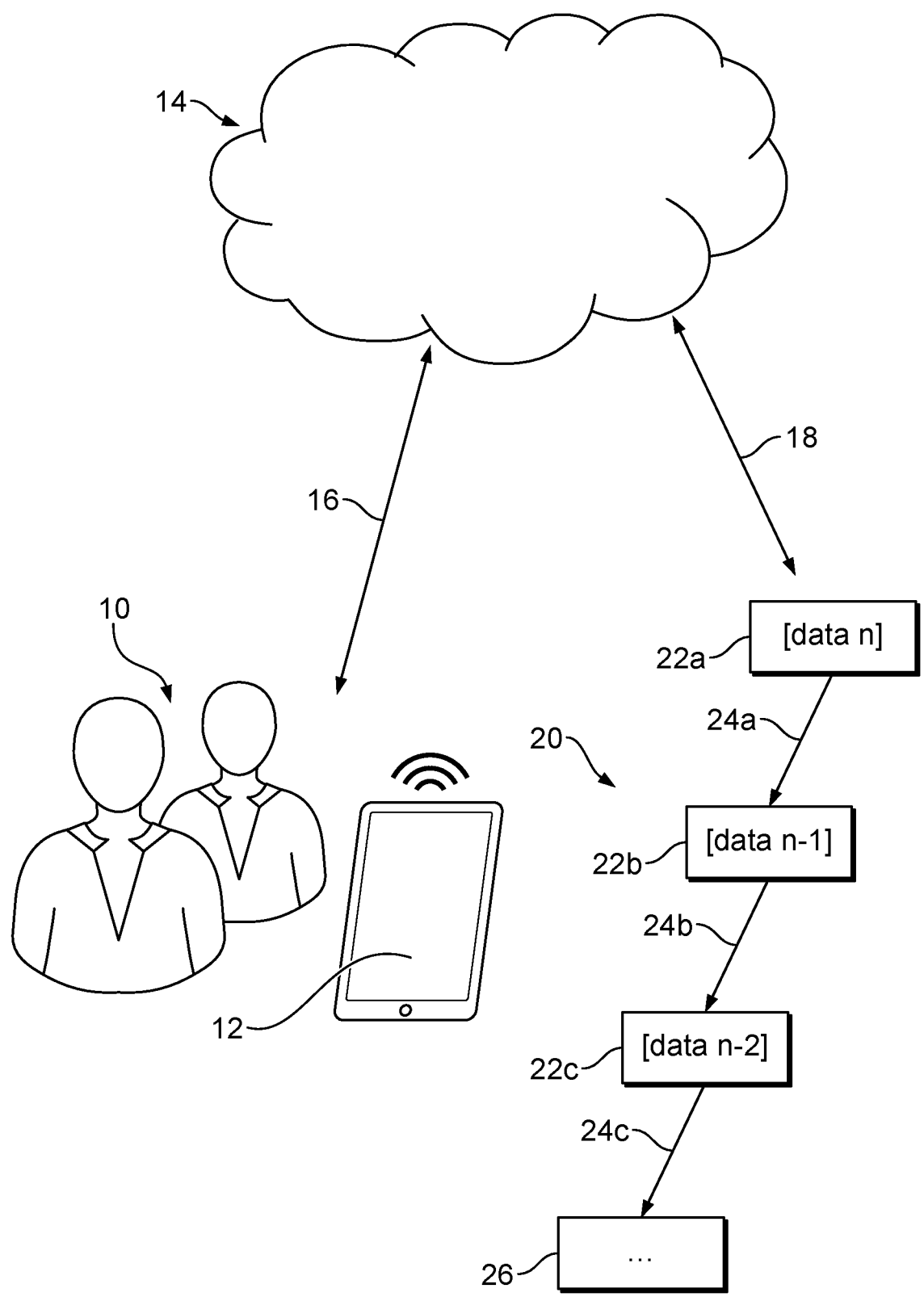
FIG. 1 is a system architecture diagram showing a system according to one embodiment of the present invention.

FIG. 1 shows an embodiment in which one or more users 10 wish to. A life event may comprise a wide variety of events or status changes, such as the time that people first meet, start to date, or fall in love, a wedding, the receipt of an award, a milestone birthday, a once-in-a-lifetime event, the creation of a company or a job promotion, or the earning of a degree. The users 10 may use a device such as a mobile phone 12 to communicate via a network 14 such as the internet. As shown by arrow 16, this communication may be a two-way communication technique, via which the users 10 may upload information to the network 14 about the event being memorialized, including optionally an image showing an aspect of the event.

The network 14, in turn, is in communication (as shown via arrow 18) with a distributed ledger network 20. In the embodiment shown in FIG. 1, the distributed ledger network 10 is a blockchain network, comprising a series of data blocks 22a-22c. Data blocks 22a, 22b, and 22c are shown, while ellipses 26 shows that this series of blocks may go back in time, eventually starting at an origin block. As the blockchain shown in FIG. 1 has n blocks, block 22a contains the data for block n, block 22b contains the data for block n−1, block 22c contains the data for block n−2, and so on.

Each data block 22a-22c references the previous data block in the chain via a reference 24. Three references 24a, 24b, and 24c are shown, though the references go back through time to eventually reference an origin block that represented the start of the blockchain. The references 24a-24c may be hashes of previous blocks, or may contain all of the data from the previous blocks. Each data block 22a-22c may be considered a data location, and may be tagged with a block number and a timestamp.

When the data pertaining to the event is stored in the distributed ledger network 20, the data is stored in a block 22a. The block number and timestamp of the block 22a is communicated back via the network 14 to the users 10. As the distributed ledger network 20 is preferably a blockchain whose blocks, once finalized according to a time schedule, cannot be changed, the information about the event as stored on the distributed ledger network is thereby rendered immutable, giving the users confidence that the record, as recorded, will be visible for as long as the distributed ledger network 20 is accessible. Information in the present invention is transmitted securely, and blockchain-based storage enhances the immutability of the stored information.

Figure 2:
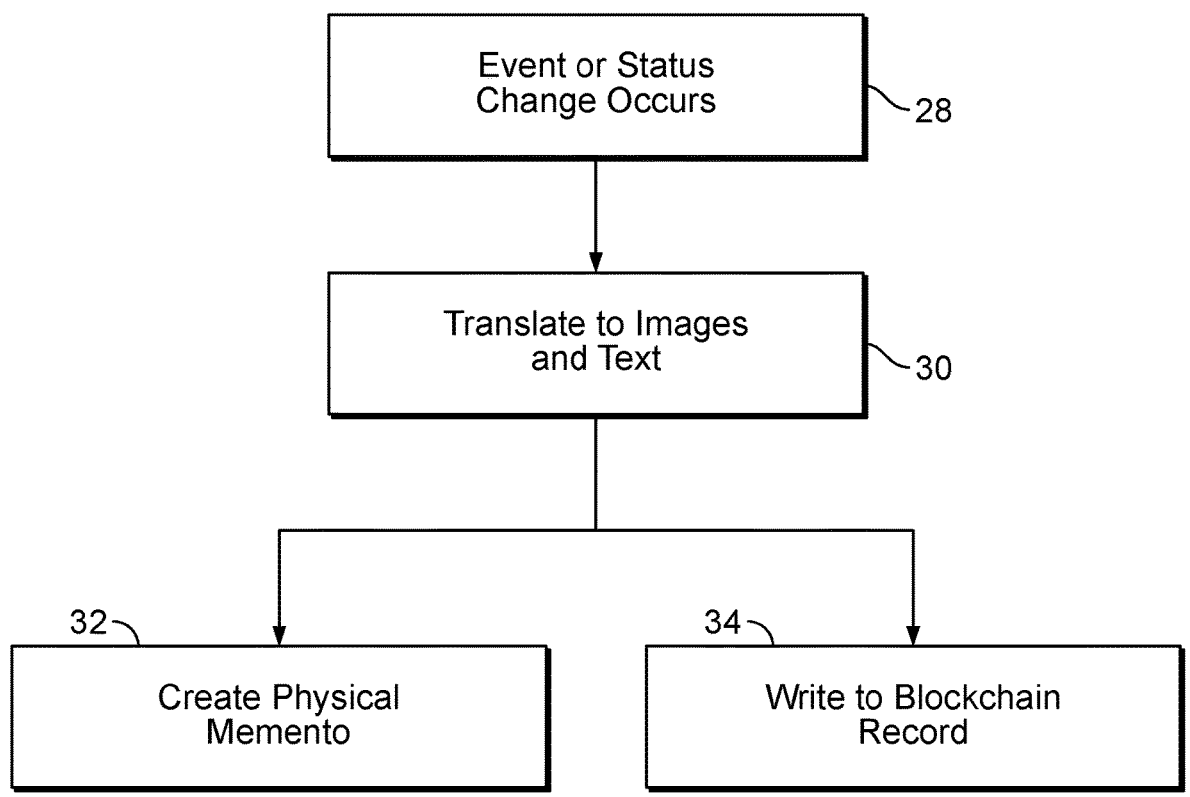
FIG. 2 is a flow chart showing steps undertaken in one embodiment of the present invention.

Systems and methods of the present invention result in the creation of a physical memento in addition to the storage of digital information. FIG. 2 is a flow chart showing this. As shown at block 28, an event or status change occurs, and as shown at block 30, that event is translated into images and text memorializing the event. This translation is preferably performed by the users 10 (pictured in FIG. 1), but may be done through a guided experience prompting users to select one or more images and to assign text to the event.

Then, as shown at blocks 32 and 34, the information about the event is used to both create a physical memento memorializing the event and to write to a distributed ledger network such as a blockchain.

Figure 3:
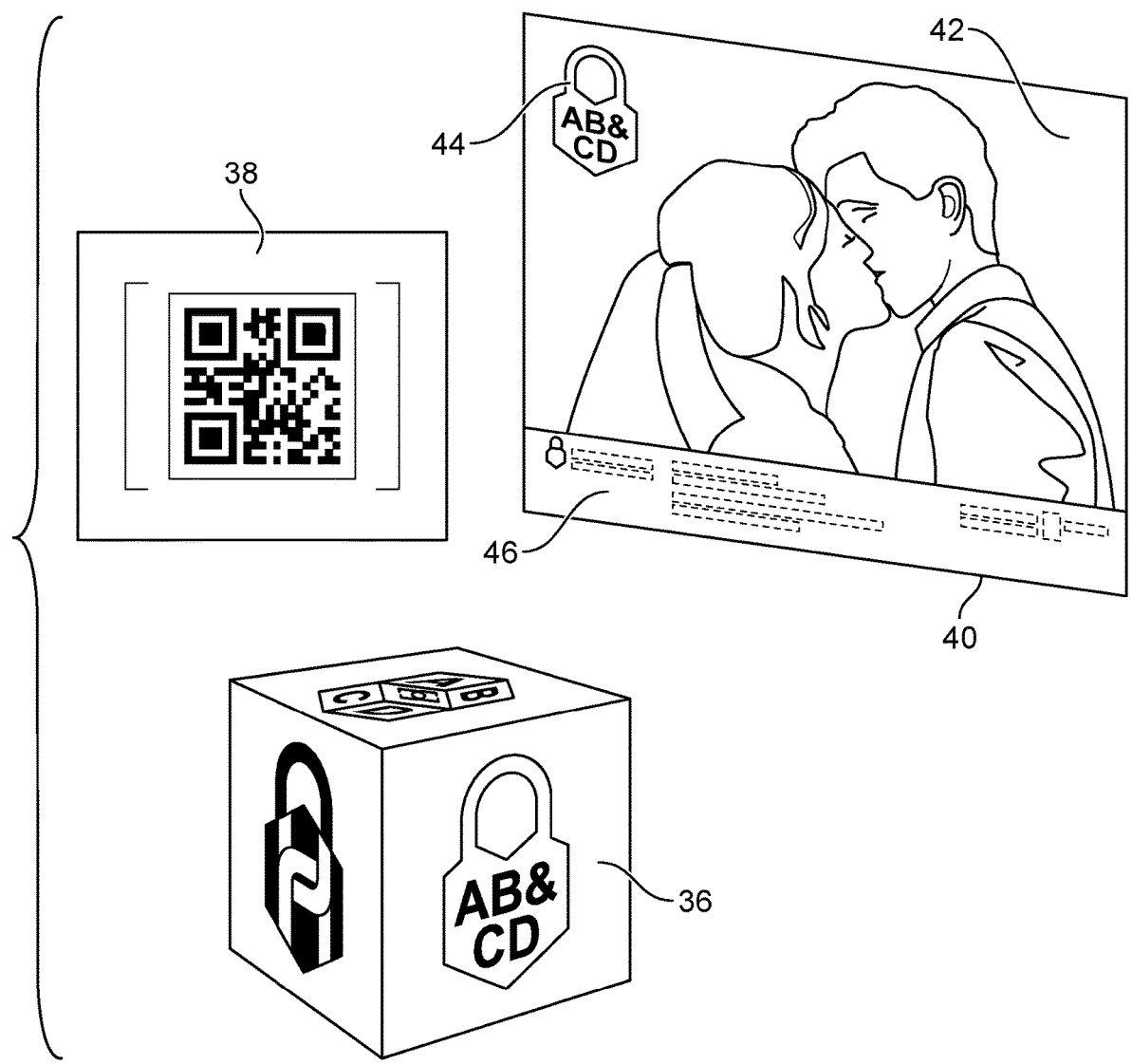
FIG. 3 is a diagram showing the creation of a physical memento in one embodiment of the present invention.

FIG. 3 shows a physical memento 36 according to one embodiment of the present invention. The memento 36 as shown in FIG. 3 is a laser-engraved titanium block, but it is to be understood that mementos make take many forms, and preferably take a substantially permanent form. For example, in some embodiments, the physical memento 36 may be a piece of jewelry, such as, for example, a locket. In the aforementioned embodiment, the memento 36 may be a titanium pendant, or locket, with a QR code engraved on it. It uses the blockchain to store information about the locket and a digital photo contained within the pendant to prove that the digital photo is unique and "owned" by the locket owner.

The physical memento 36 as shown in FIG. 3 has, provided upon it, visible insignias such as initials (in the case of a "love lock" style memento), branding information, a blockchain insignia, and other insignias.

Also provided on the memento 36 may be a QR code 38 which, when scanned by a device, results in the display of information related to the event memorialized by the memento 36. FIG. 3 shows a screen image 40 of information that may be stored on a distributed ledger network and retrieved through the use of the QR code 38. The information includes an image 42, an icon 44 including information about the event, and text-based information about the event as shown at 46. This text-based information may include the name of the event, text describing the event, and the timestamp and block number that digital information about the event is stored at. The image 40 may also contain a photograph or computer-generated image of the memento 36.

Figure 4:
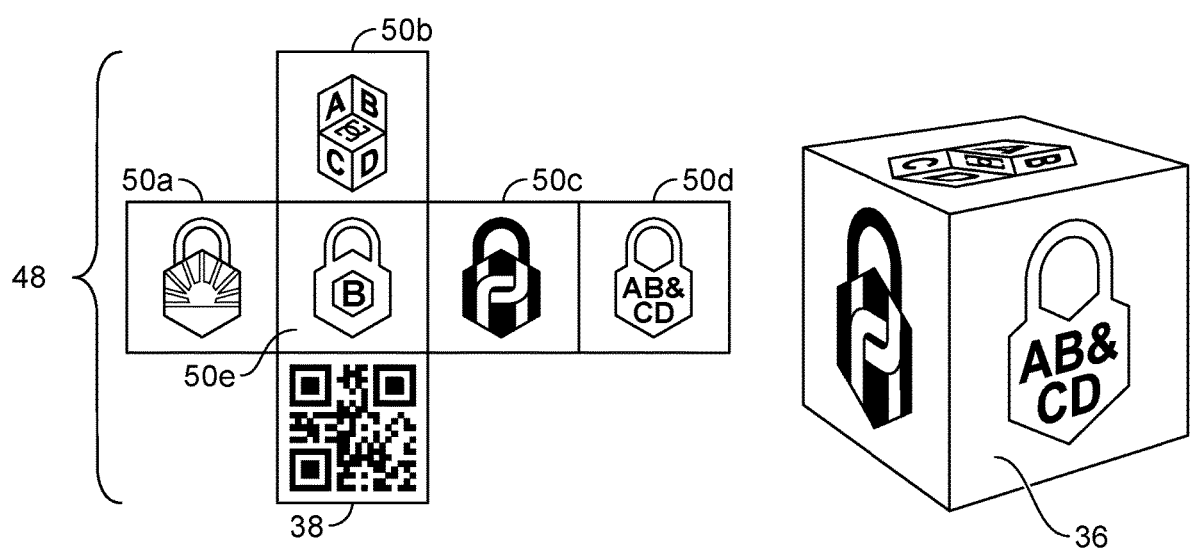
FIG. 4 further illustrates insignias that may be provided on a memento according to the present invention, via a plan view of the sides of a cube.

In one embodiment, the image 40 in FIG. 4 is a certificate confirming that the information is stored on a distributed ledger network, and this certificate may be hosted apart from the distributed ledger network. The certificate may contain a link to the distributed ledger network, allowing examination of the block containing the event information.

In one embodiment, the certificate may be a verifiable digital diploma. In such an embodiment, the physical item may be designed to replace traditional printed paper diplomas. For example, the physical item may be a titanium cube with a QR code engraved on it. In particular, each side of the titanium cube may be engraved with different information such as: a notation that the cube represents a W3C-compliant digital diploma, the degree itself represented by words and/or images; the issuing institution represented by words and/or images; a link to a tamper-proof, cryptographically verifiable diploma; accreditation of issuing institution represented by words and/or images; and the holder of the digital diploma. Similarly, in some embodiments, there may be a QR code that when scanned on a mobile phone takes the user of the mobile phone to a webpage where they may share the diploma, verify it's veracity, and print the diploma.

FIG. 4 further illustrates insignias that may be provided on a memento 36 according to the present invention, via a plan view 48 of the sides of a cube. Visible in the plan view 48 are branding and other insignias 50a-50e and a QR code 38.

As will be understood, systems and methods according to the present invention have a variety of advantages over traditional means of recording information about events. For example, because information about an event can be viewed from virtually any network connection, the number of places information can be seen is essentially unlimited. The message may be seen in new places over time, and the strength of the message may increase over time because of the immutable recording of the message on a blockchain. The message is substantially immune from being removed by authorities because of the distributed nature of the information storage technique. Both a tangible memento and a permanent digital record are stored.

Embodiments of the present invention may utilize a number of different types of digital ledger networks. In one embodiment, the digital ledger network is the bitcoin network. In another embodiment, the digital ledger network is the BSV network. In some embodiments, event information may be stored in multiple digital ledger networks at approximately the same time.

The methods and systems discussed herein may be implemented via one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

The server(s), client computing platform(s), and any other discussed third parties may be communicatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s), client computing platform(s), and any other discussed third parties may be operatively linked via some other communication media.

A given client computing platform may include one or more processors configured to execute computer program modules. The computer program modules may be configured to enable a user associated with the given client computing platform to interface with the described systems and methods and/or provide other functionality attributed herein to client computing platform(s). By way of non-limiting example, the given client computing platform may include one or more of a desktop computer, a laptop computer, a handheld computer, a tablet computing platform, a Smartphone, a gaming console, a VR/AR headset or other device, and/or other computing platforms.

Server(s) may include electronic storage and one or more processors, and/or other components. Server(s) may include communication lines, or ports to enable the exchange of information with a network and/or other computing platforms. Illustration of server(s) is not intended to be limiting.

Server(s) may include a plurality of hardware, software, and/or firmware components operating together to provide the functionality attributed herein to server(s). For example, server(s) may be implemented by a cloud of computing platforms operating together as server(s).

The electronic storage may comprise non-transitory storage media that electronically stores information. The electronic storage media may include one or both of system storage that is provided integrally (i.e., substantially non-removable) with server(s) and/or removable storage that is removably connectable to server(s) via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private Network, and/or other virtual storage resources). The electronic storage may store software algorithms, information determined by processor(s), information received from server(s), information received from client computing platform(s), databases and/or other information that enables server(s) to function as described herein.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information. Although processor(s) may function as a single entity, in other implementations, processor(s) may include a plurality of processing units. These processing units may be physically located within the same device, or processor(s) may represent processing functionality of a plurality of devices operating in coordination. Processor(s) may be configured to execute instructions for applications, or modules, by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components.

The various messaging and data transfer described above can be accomplished with a REST API (or "RESTful" API). A RESTful API is an application program interface (API) that uses HTTP calls to request resources as opposed to functions. The function is embedded in the HTTP call through requests to GET, PUT, POST and DELETE, for example. The API spells out the proper way to request data, from an operating system or other application and allows management of customer data, sales orders, inventory, and products. This entire process can be open-sourced to the general public through permissioned API endpoints and PGP keys for encryption of data transmission in a single package as an SDK.

The invention claimed is:

1. A system for creating a physical memento with digital tracking, comprising:
   one or more processors;
   a network interface device coupled to the one or more processors;
   a distributed ledger network;
   one or more engraving tools; and
   a physical memento;
   wherein the one or more processors are configured to receive a personal message, transmit, via the network interface device, a secure message based on the personal message to the distributed ledger network,
   wherein the secure message is recorded in the distributed ledger network and the secure message comprises a timestamp associated with the message; and
   the one or more engraving tools are configured to engrave the physical memento with information relevant to the message, wherein the physical memento is further engraved with a QR code that allows a user to retrieve information stored on the distributed ledger network relevant to the personal message.

2. The system of claim 1, wherein the personal message is created by the user using a mobile phone.

3. The system of claim 1, wherein the personal message comprises information memorializing a life event.

4. The system of claim 1, wherein the personal message is created by the user of the system in response to an event or status change that occurred.

5. The system of claim 1, wherein the personal message is created by the user through a guided experience prompting users to select one or more images and to assign text to an event.

6. The system of claim 1, wherein the secure message further comprises an image, an icon including information about an event, and text-based information about the event.

7. The system of claim 1, wherein the distributed ledger network is a blockchain based network.

8. The system of claim 1, wherein the physical memento is a titanium block, or a titanium pendant.

9. The system of claim 1, wherein the physical memento is engraved with information representative of a verifiable certificate.

10. A computer-implemented method for creating a physical memento with digital tracking, comprising:
    receiving, at one or more processors, a personal message selected by a user;
    transmitting, at the one or more processors via a network interface device coupled to the one or more processors, a secure message based on the personal message to a distributed ledger network,
    wherein the secure message is recorded in the distributed ledger network and the secure message comprises a timestamp associated with the message; and
    transmitting, at the one or more processors via the network interface device coupled to the one or more processors, to one or more engraving tools, information relevant to the message to engrave a physical memento, wherein the physical memento is further engraved with a QR code that allows a user to retrieve information stored on the distributed ledger network relevant to the personal message.

11. The computer-implemented method of claim 10, wherein the personal message is created by the user using a mobile phone.

12. The computer-implemented method of claim 10, wherein the personal message comprises information memorializing a life event.

13. The computer-implemented method of claim 10, wherein the personal message is created by the user of the system in response to an event or status change that occurred.

14. The computer-implemented method of claim 10, wherein the personal message is created by the user through a guided experience prompting users to select one or more images and to assign text to an event.

15. The computer-implemented method of claim 10, wherein the secure message further comprises an image, an icon including information about an event, and text-based information about the event.

16. The computer-implemented method of claim 10, wherein the distributed ledger network is a blockchain based network.

17. The computer-implemented method of claim 10, wherein the physical memento is a titanium block, or a titanium pendant.

18. The computer-implemented method of claim 10, wherein the physical memento is engraved with information representative of a verifiable certificate.

\* \* \* \* \*